C. BILLUPS.
PLOWS.
No. 185,383. Patented Dec. 19, 1876.
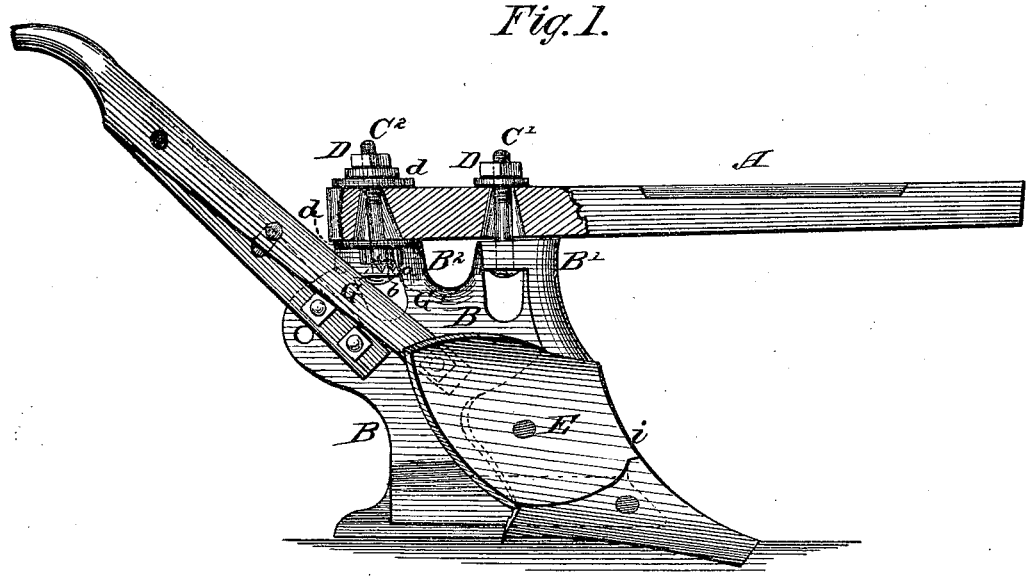
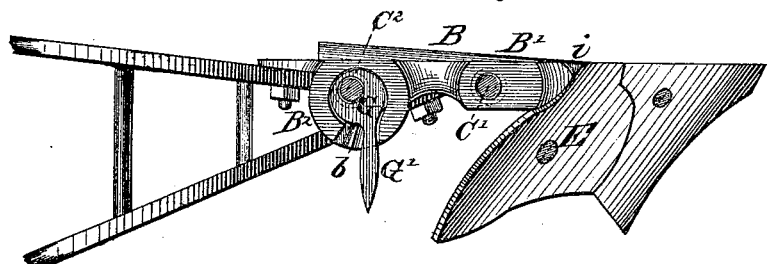
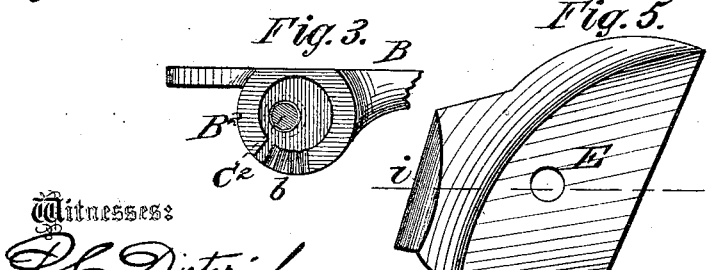
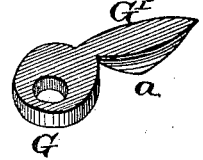
Witnesses:
P. C. Dieterich
Frank H. Duffy
Inventor:
Cealy Billups
Per: C. H. Watson & Co. Attorneys.
THE GRAPHIC CO. N.Y.

UNITED STATES PATENT OFFICE.

CEALY BILLUPS, OF NORFOLK, VIRGINIA.

IMPROVEMENT IN PLOWS.

Specification forming part of Letters Patent No. 185,383, dated December 19, 1876; application filed November 1, 1876.

*To all whom it may concern:*

Be it known that I, CEALY BILLUPS, of Norfolk, in the county of Norfolk and State of Virginia, have invented certain new and useful Improvements in Plows; and I do hereby declare that the following is a full, clear, and exact description thereof, which will enable others skilled in the art to which it appertains to make and use the same, reference being had to the accompanying drawings, and to the letters of reference marked thereon, which form a part of this specification.

The nature of my invention consists in the devices for adjusting the plow-beam, as will be hereinafter more fully set forth.

In the annexed drawing, Figure 1 is a side elevation, partly in section. Fig. 2 is a plan view, with beam removed. Figs. 3, 4, 5, and 6 are detail views, of my invention.

A represents the plow-beam, and B the standard, fastened thereto.

The standard B forms at its top two seats, $B^1$ and $B^2$, upon which the beam rests, and is fastened by means of two bolts, $C^1$ and $C^2$, passing upward through the same, and secured by nuts D D on the upper ends of the bolts on top of the beam. In the top of the rear seat $B^2$ is made a circular recess, in which is placed a disk, G, provided with a lever, $G^1$, projecting through a slot in the side of said rest $B^2$. On the under side of this projecting lever $G^1$ is a flange or rib, $a$, to take into ratchets $b$, formed on the standard, as shown. The bolt $C^2$ passes up through the disk G to one side of the center thereof, so that the disk and its lever form an eccentric lever, by means of which the beam may be laterally adjusted as required.

By loosening the nuts D D the eccentric lever can be turned, when the beam turns upon the front bolt $C^1$ as on a pivot, either to the right or left, and, when properly adjusted, the nuts are again screwed down and the beam held, the ratchets preventing any possibility of the beam slipping. The rear end of the beam rests upon the seat $B^2$, and between this seat and beam, and also between the beam and the rear nut, are placed washers $d$ $d$, which may be changed, as desired, so as to adjust the beam vertically as well as laterally.

E represents the mold-board, constructed in any suitable form and shape, and provided on its rear side with a rib or enlargement, $i$, as shown. This rib or enlargement runs nearly diagonally across the back of the mold-board in such a manner as to follow the curvature of the furrow-slice; and its object is to strengthen the mold-board at the most vulnerable point, and to increase its durability without excess of metal.

Having thus fully described my invention, what I claim as new, and desire to secure by Letters Patent, is—

1. The standard B, having seats $B^1$ and $B^2$, in combination with the beam A and the eccentric lever G $G^1$, the lever being arranged between the standard and beam, and serving to adjust the beam in any desired position, substantially as set forth.

2. A plow-standard curving rearward in front, having two seats, on which to rest the beam independently of the handle, the front seat being the pivot, and the rear seat being cut away and provided with ratchet-teeth and slot, the same to work in combination with beam, bolt, and eccentric, substantially as and for the purpose described.

3. The combination of the plow-standard B, having recessed seat $B^2$ and notched opening $b$, with eccentric lever G, toothed arm $G^1$, whereby the beam is adjusted laterally, and held in any desired position, substantially as set forth.

In testimony that I claim the foregoing as my own I affix my signature in presence of two witnesses.

CEALY BILLUPS.

Witnesses:
C. H. WATSON,
P. C. DIETERICH.